(12) United States Patent
Hardikar et al.

(10) Patent No.: US 9,182,152 B2
(45) Date of Patent: Nov. 10, 2015

(54) PHOTOVOLTAIC MODULE SUPPORT WITH CABLE CLAMPS

(75) Inventors: Kedar Hardikar, Santa Clara, CA (US); Roger Balyon, San Jose, CA (US)

(73) Assignee: Apollo Precision (Fujian) Limited, Quanzhou (CN)

( * ) Notice: Subject to any disclaimer, the term of this patent is extended or adjusted under 35 U.S.C. 154(b) by 949 days.

(21) Appl. No.: 12/895,340

(22) Filed: Sep. 30, 2010

(65) Prior Publication Data

US 2012/0080076 A1    Apr. 5, 2012

(51) Int. Cl.
*H02S 20/23* (2014.01)
*F24J 2/52* (2006.01)
*H01L 31/042* (2014.01)

(52) U.S. Cl.
CPC .............. *F24J 2/5256* (2013.01); *F24J 2/5205* (2013.01); *F24J 2/5241* (2013.01); *F24J 2/5254* (2013.01); *F24J 2/5258* (2013.01); *H02S 20/00* (2013.01); *H02S 20/23* (2014.12); *Y02B 10/12* (2013.01); *Y02E 10/47* (2013.01); *Y10T 29/49355* (2015.01)

(58) Field of Classification Search
CPC ........ H02S 20/00; H02S 20/23; F24J 2/5241; F24J 2/5254; F24J 2/5256; F24J 2/5205; F24J 2/5258
USPC .................................................. 136/243–251
See application file for complete search history.

(56) References Cited

U.S. PATENT DOCUMENTS

| | | | |
|---|---|---|---|
| 3,682,516 A * | 8/1972 | Savage ........................ | 403/189 |
| 4,832,001 A | 5/1989 | Baer | |
| 4,942,865 A | 7/1990 | Pierce-Bjorklund | |
| 5,043,024 A | 8/1991 | Cammerer et al. | |
| 5,125,608 A | 6/1992 | McMaster et al. | |
| 5,460,660 A | 10/1995 | Albright et al. | |
| 5,478,407 A * | 12/1995 | Dorison et al. ............... | 136/244 |
| 5,505,788 A | 4/1996 | Dinwoodie | |
| 5,746,839 A | 5/1998 | Dinwoodie | |
| 6,082,060 A | 7/2000 | Bauer et al. | |
| 6,201,179 B1 | 3/2001 | Dalacu | |
| 6,672,018 B2 | 1/2004 | Shingleton | |
| 6,959,517 B2 | 11/2005 | Poddany et al. | |
| 8,209,919 B2 | 7/2012 | Beck | |
| 8,656,658 B2 | 2/2014 | Shufflebothem et al. | |
| 2002/0029799 A1 | 3/2002 | Yoda et al. | |
| 2003/0070368 A1 | 4/2003 | Shingleton | |
| 2005/0178428 A1 | 8/2005 | Laaly et al. | |
| 2006/0213571 A1 * | 9/2006 | Bean ............................. | 138/155 |
| 2006/0243318 A1 | 11/2006 | Feldmeier et al. | |

(Continued)

FOREIGN PATENT DOCUMENTS

GB    2049158    12/1980
JP    06-085302    3/1994

OTHER PUBLICATIONS

International Search Report and Written Opinion mailed Apr. 24, 2012, for Application No. PCT US2011/053972.

(Continued)

*Primary Examiner* — Marla D McConnell
(74) *Attorney, Agent, or Firm* — Weaver Austin Villeneuve & Sampson LLP

(57) ABSTRACT

Apparatus and techniques for mounting frameless photovoltaic modules reduce module stress induced by the mounting configuration. Cable clamps and cable spacing configured to relieve module stress by reducing or eliminating module sag are used.

30 Claims, 11 Drawing Sheets

(56) References Cited

U.S. PATENT DOCUMENTS

| | | |
|---|---|---|
| 2008/0041442 A1 | 2/2008 | Hanoka |
| 2008/0066801 A1 | 3/2008 | Schwarze |
| 2008/0236567 A1* | 10/2008 | Hayden .................. 126/569 |
| 2008/0236571 A1 | 10/2008 | Keshner et al. |
| 2008/0244881 A1 | 10/2008 | Zante |
| 2008/0302409 A1 | 12/2008 | Bressler et al. |
| 2008/0308142 A1 | 12/2008 | Grip et al. |
| 2008/0315061 A1 | 12/2008 | Fath et al. |
| 2009/0114270 A1 | 5/2009 | Stancel |
| 2009/0114271 A1 | 5/2009 | Stancel |
| 2009/0250580 A1 | 10/2009 | Strizki |
| 2009/0302183 A1 | 12/2009 | Strizki |
| 2010/0038507 A1 | 2/2010 | Schwarze et al. |
| 2010/0059641 A1 | 3/2010 | Twesme et al. |
| 2010/0108113 A1* | 5/2010 | Taggart et al. .................. 135/96 |
| 2010/0132766 A1 | 6/2010 | Jenkins |
| 2010/0219304 A1 | 9/2010 | Miros et al. |
| 2010/0237028 A1 | 9/2010 | Cusson |
| 2010/0269428 A1 | 10/2010 | Stancel et al. |
| 2011/0197954 A1 | 8/2011 | Young et al. |
| 2011/0265861 A1 | 11/2011 | Nabauer et al. |
| 2012/0080074 A1 | 4/2012 | Hardikar et al. |
| 2012/0080075 A1 | 4/2012 | Hardikar et al. |
| 2012/0080077 A1 | 4/2012 | Balyon et al. |
| 2012/0097207 A1 | 4/2012 | Shufflebotham et al. |
| 2012/0234378 A1 | 9/2012 | West et al. |
| 2012/0260977 A1 | 10/2012 | Stancel |

OTHER PUBLICATIONS

International Search Report and Written Opinion mailed May 17, 2012, for Application No. PCT US2011/056637.

Unirac Bright Thinking in Solar, latest press releases, "Unirac's solarmount-I chosen by arise solar for 200kW installation to power residentail apartment complex", Unirac revolutionizes residential PV mounting with introduction of solarmount-I, Unirac launches non-penetrating attachment for seamed metal roofs, "Spire corporation chooses Unirac and CLICKSYS to support 1.6MW solar project", "Rosendin electric, Inc. selects Unirac to support 1.15MW San Jose international airport solar project", May 4, 2010-Aug. 30, 2010, downloaded from http://www.unirac.com on Sep. 30, 2010.

Schletter Inc., "Module clamps overview" catalogue, www.schletter-inc.us, update 2009.

U.S. Appl. No. 12/894,704, "Photovoltaic module support with elastomer", Hardikar et al., filed Sep. 30, 2010.

U.S. Appl. No. 12/895,328, "Photovoltaic module support clamp assembly", Hardikar et al., filed Sep. 30, 2010.

U.S. Appl. No. 12/895,594, "Photovoltaic module support with interface strips", Balyon et al., filed Sep. 30, 2010.

U.S. Appl. No. 12/894,704, Office Action mailed Jan. 16, 2013.

U.S. Appl. No. 12/908,778, Office Action mailed Apr. 10, 2013.

U.S. Appl. No. 12/895,328, Office Action mailed Jun. 7, 2013.

U.S. Appl. No. 12/895,594, Office Action mailed May 31, 2013.

U.S. Appl. No. 12/894,704, Office Action mailed Aug. 30, 2013.

U.S. Appl. No. 12/895,328, Office Action mailed Oct. 24, 2013.

Schierle, "Indeterminate beams," 2011, pp. 1-16.

U.S. Appl. No. 12/895,594, Office Action mailed Nov. 19, 2013.

U.S. Appl. No. 12/908,778, Notice of Allowance mailed Oct. 11, 2013.

U.S. Appl. No. 12/895,594, Office Action mailed Jun. 6, 2014.

U.S. Appl. No. 12/895,328, Office Action mailed Oct. 30, 2014.

U.S. Appl. No. 12/895,594, Office Action mailed Jan. 5, 2015.

U.S. Appl. No. 12/894,704, Office Action mailed Feb. 23, 2015.

U.S. Appl. No. 12/895,328, Notice of Allowance mailed Feb. 26, 2015.

* cited by examiner

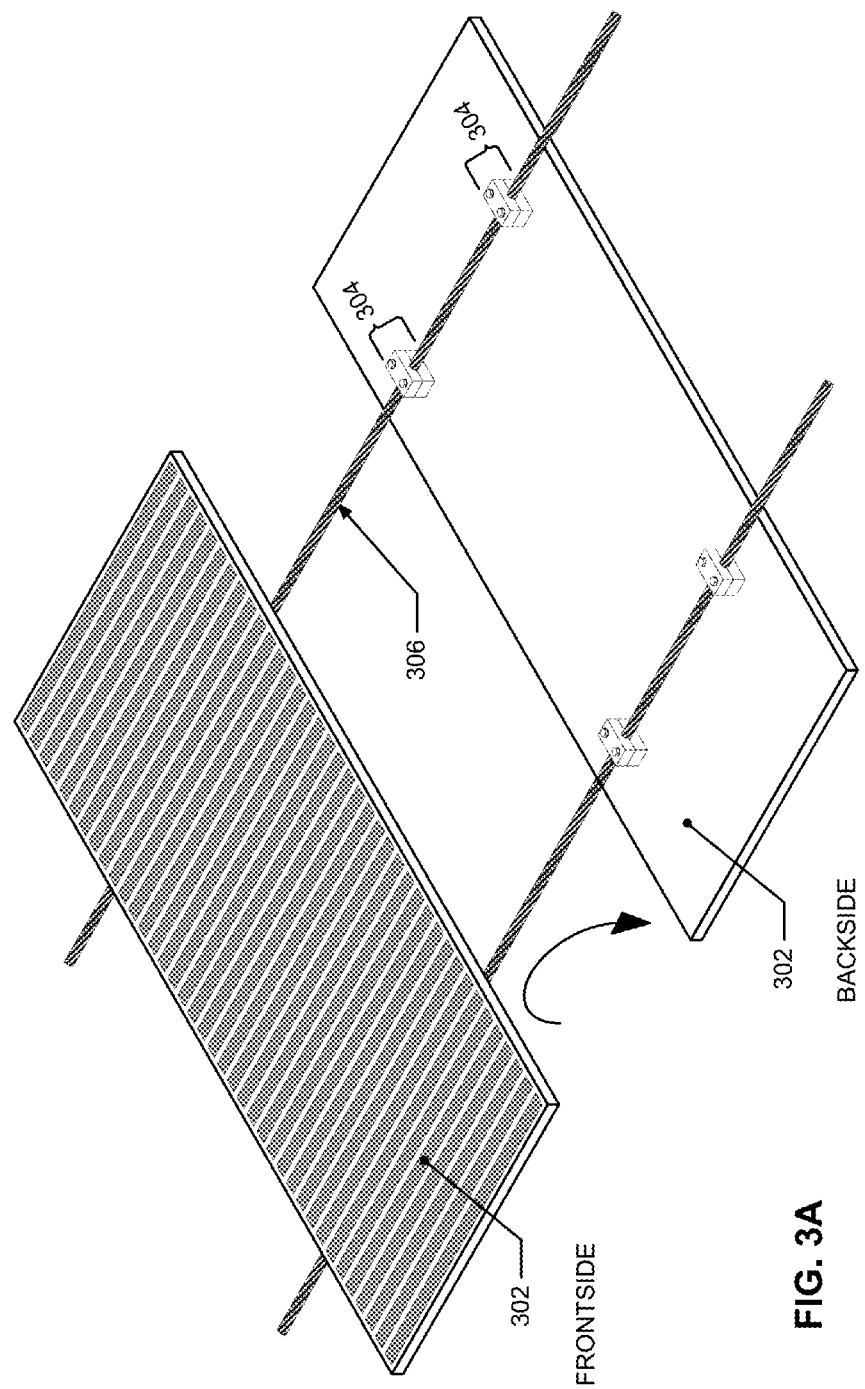

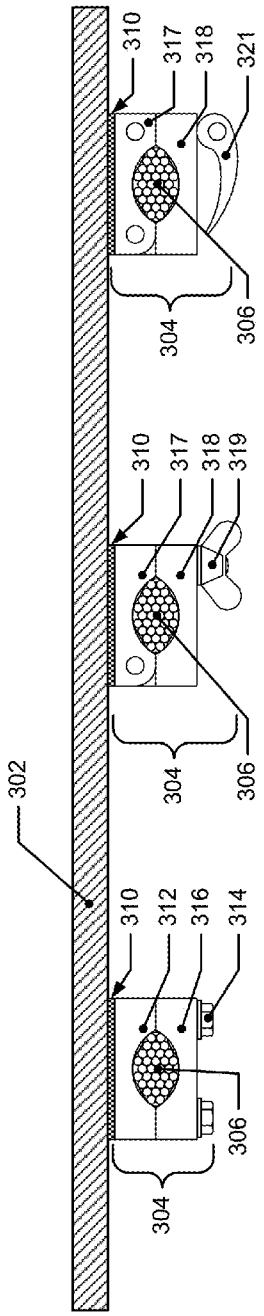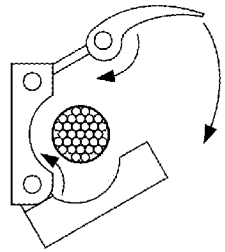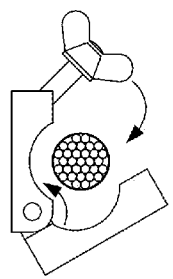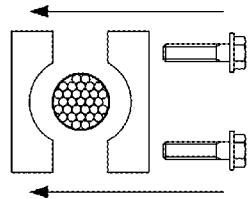

PHOTOVOLTAIC MODULE SUPPORT WITH CABLE CLAMPS

BACKGROUND OF THE INVENTION

Photovoltaic cells are widely used for generation of electricity, with multiple photovoltaic cells interconnected in module assemblies. Such modules may in turn be arranged in arrays and integrated into building structures or otherwise assembled to convert solar energy into electricity by the photovoltaic effect. Arrays of modules are typically mounted on racking systems on the roofs of buildings or on ground-based structures. The modules are required to pass load testing to ensure that they can safely withstand snow loading and other environmental conditions. This can be challenging for frameless photovoltaic modules.

SUMMARY OF THE INVENTION

The invention relates generally to apparatus and techniques for mounting frameless photovoltaic modules in a cable-based mounting system to reduce module stress induced by the mounting configuration. The invention involves cable clamps installed on photovoltaic modules and a cable-based mounting systems with cable spacing configured to relieve module stress by reducing or eliminating module sag.

In one aspect, the invention relates to a photovoltaic module assembly. The photovoltaic module assembly includes a frameless photovoltaic module having a frontside sheet and a backside sheet, and cable clamps configured for attachment of the module to a cable across the backside sheet.

In another aspect, the invention relates to a photovoltaic assembly. The photovoltaic assembly includes a frameless photovoltaic module having a frontside sheet and a backside sheet, a cable set, and cable clamps attached to the frameless photovoltaic module across the backside sheet, wherein the frameless photovoltaic module is secured to the cable set via the cable clamps.

Another aspect of the invention relates to a method of installing a frameless photovoltaic module having a frontside sheet and a backside sheet onto a cable set. The method involves providing the cable set and securing the frameless photovoltaic module onto the cable set with cable clamps attached to the backside sheet of the frameless photovoltaic module.

These and other aspects of the invention are described further below with reference to the figures.

BRIEF DESCRIPTION OF THE DRAWINGS

FIG. 3A is an isometric view of the front and back sides of representative frameless photovoltaic modules, cables, and installed cable clamps.

FIG. 3C is a side view of a representative saddle-clamp cable clamp.

FIG. 3D is a side view of the representative saddle-clamp of FIG. 3C but in an exploded view.

FIG. 3E is a side view of a representative wingnut cable clamp.

FIG. 3F is a side view of the representative wingnut cable clamp of FIG. 3E but in an opened configuration prior to cable clamping.

FIG. 3G is a side view of a representative draw-latch clamp.

FIG. 3H is a side view of the representative draw-latch clamp of FIG. 3G but in an opened configuration prior to cable clamping.

DETAILED DESCRIPTION

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well known mechanical apparatuses and/or process operations have not been described in detail in order not to unnecessarily obscure the present invention.

Frameless Photovoltaic Modules

Photovoltaic modules are required to meet load ratings specified by IEC 61646 and UL 1703, incorporated herein by reference for this purpose. In this regard, a module must be able to pass a 2400 MPa static load test for wind and 5400 MPa static loading test for snow/ice. This load testing requirement can be particularly challenging for a frameless photovoltaic module (a module without a metallic frame around its perimeter) to meet. Further, the structural stability and module integrity can be difficult to preserve in a racking system for frameless photovoltaic modules.

Figure 1A:
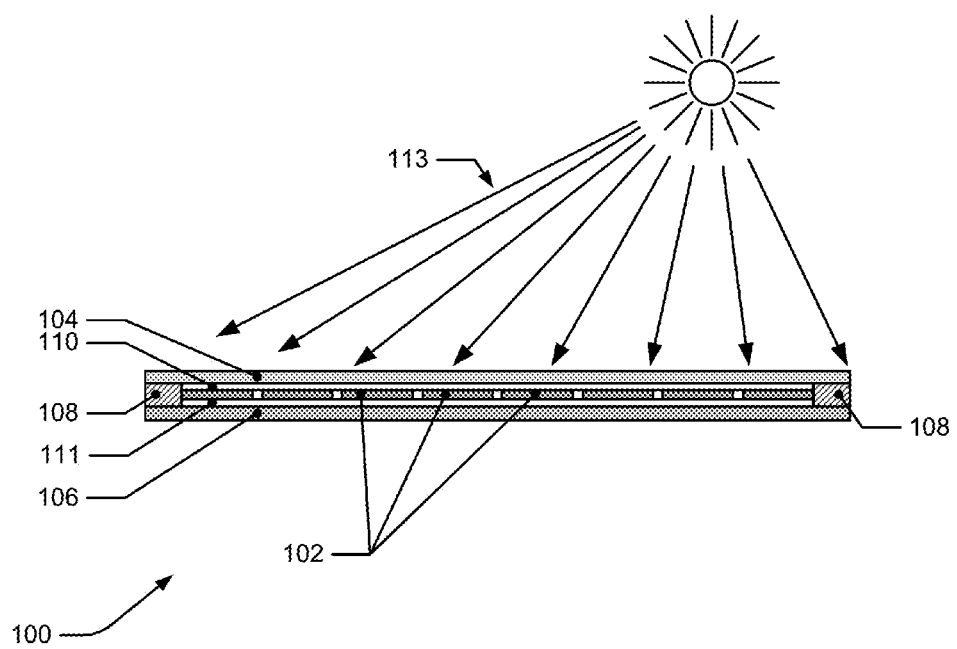
FIG. 1A shows a cross-sectional view of representative frameless photovoltaic module in accordance with the present invention.

Embodiments of the present invention relate to mounting of frameless photovoltaic modules (also referred to as solar modules or solar panels or, in this application, simply as modules), and associated racking systems and methods. FIG. 1A shows a not-to-scale cross-sectional view of certain components of a frameless solar module 100 in accordance with one embodiment of the present invention. The module 100 includes interconnected solar cells 102 and front (light-incident) and back layers 104 and 106, respectively, for environmental protection and mechanical support. A light-transmissive thermoplastic polymer encapsulant 110 is also provided between the solar cells 102 and the front layer 104 to provide electrical insulation and further protection to the underlying solar cells by preventing direct contact between the solar cells and the generally rigid front layer 104. The same or a different encapsulant layer 111 may also be provided between the solar cells 102 and the back layer 106 for the same reasons. In certain modules, an additional edge material 108 surrounds the solar cells 102, and in this example, is embedded within encapsulating layers 110 and 111.

The front and back layers may be any suitable material that provides the environmental protection and mechanical support required for reliable module operation. In some typical embodiments, the front and back layers are rigid plates, light transmitting in the case of the front layer, such as glass, although other materials, such as polymers, multi-layer laminates and metals that meet the functional requirements may also be used. In other embodiments the typical rigid back layer (e.g., back glass plate) can be replaced with a much lighter weight flexible material, thereby reducing handling costs associated with the module.

The front, light-incident layer 104 should transmit visible and near visible wavelengths of the solar spectrum 113 and be chemically and physically stable to anticipated environmental conditions, including solar radiation, temperature extremes, rain, snow, hail, dust, dirt and wind to provide protection for the module contents below. A glass plate comprising any suitable glass, including conventional and float glass, tempered or annealed glass, combinations thereof, or other glasses, is preferred in many embodiments. The total thickness of a suitable glass or multi-layer glass layer 104 may be in the range of about 2 mm to about 15 mm, optionally from about 2.5 mm to about 10 mm, for example about 3 mm or 4 mm. As noted above, it should be understood that in some embodiments, the front layer 104 may be made of a non-glass material that has the appropriate light transmission, stability and protective functional requirements. The front layer 104, whether glass or non-glass, transmits light in a spectral range from about 400 nm to about 1100 nm. The front layer 104 may not necessarily, and very often will not, transmit all incident light or all incident wavelengths in that spectral range equally. For example, a suitable front layer is a glass plate having greater than 50% transmission, or even greater than 80% or 90% transmission from about 400-1100 nm. In some embodiments, the front layer 104 may have surface treatments such as but not limited to filters, anti-reflective layers, surface roughness, protective layers, moisture barriers, or the like. Although not so limited, in particular embodiments the front layer 104 is a tempered glass plate about 3 mm thick.

The back layer 106 may be the same as or different than the front layer 104 and is also typically a glass plate as described above. However, since the back layer 106 does not have the same optical constraints as the front layer 104, it may also be composed of materials that are not optimized for light transmission, for example metals and/or polymers. And, while the present invention is applicable in more typical module configurations having both front and back glass plate layers, the invention finds particularly advantageous application in embodiments in which the back layer 104 is a lighter weight flexible material. Such lighter weight modules have manufacturing and transportation benefits, but can present additional challenges for module stability, including compliance with load testing requirements stresses induced by module mounting configurations. In such embodiments, the back layer 106 may be a flexible yet weatherable laminate that protects the photovoltaic cells and other module components from moisture, UV exposure, extreme temperatures, etc. The back layer laminate may include a weatherable back sheet exposed to the exterior of the module. The back sheet should be resistant to environmental conditions expected to be experienced by the module (e.g., temperatures of about −40 to 90° C.), so that it is stable throughout the range of temperate climate temperatures and conditions so as to retain its properties to perform its protective function.

The back sheet may be composed of a fluoropolymer, including but not limited to polyvinyl fluoride (PVF) (e.g., Tedlar® film available from DuPont), polyvinylidene fluoride (PVDF), ethylene-tetrafluoroethylene (ETFE), fluorinated ethylene-propylene (FEP), perfluoroalkoxy (PFA) and polychlorotrifluoroethane (PCTFE). Other weatherable materials may be used in addition to or instead of a fluoropolymer, including silicone polyesters, chlorine-containing materials such as polyvinyl chloride (PVC), plastisols, polyethylene terephthalate (PET), polypropylene, polybutylene, polybutylene terephthalate, and acrylics or combinations (laminated stacks) of the above. In certain embodiments, any material that meets UL 1703 requirements (incorporated by reference herein) can be used. In one example, the back layer includes PVF (e.g., Tedlar®). In certain examples, the thickness may range from about 2 to about 12 mils, although other thicknesses may be used as appropriate. A suitable flexible back layer laminate may also include a flexible moisture barrier sandwiched between an insulation sheet, for example a sheet of PET, and the weatherable back sheet. A suitable moisture barrier may be a metallic sheet, such as an aluminum foil. A suitable laminate back sheet in accordance with some embodiments of the invention is composed of a polyvinyl fluoride/Al foil/polyethylene terephthalate laminate (e.g., Tedlar®/Al foil/PET). Further description of suitable flexible back layers for photovoltaic cells that may be used in modules in accordance with the present invention is provided in U.S. Published Patent Application No. 2008/0289682 and U.S. Published Patent Application No. 2010-0071756, each of which is incorporated by reference herein for this purpose.

The edge material 108 may be an organic or inorganic material that has a low inherent water vapor transmission rate (WVTR) (typically less than 1-2 $g/m^2/day$) and, in certain embodiments may absorb moisture and/or prevent its incursion. In one example, a butyl-rubber containing a moisture getter or desiccant is used.

The solar cells 102 may be any type of photovoltaic cell including crystalline and thin film cells such as, but not limited to, semiconductor-based solar cells including microcrystalline or amorphous silicon, cadmium telluride, copper indium gallium selenide or copper indium selenide, dye-sensitized solar cells, and organic polymer solar cells. In particular embodiments, the cells are copper indium gallium selenide (CIGS) cells. In other aspects of the invention, the cells can be deposited as thin films on the front, light-incident (e.g., glass) layer 104. Direct deposition of a solar cell on glass is described, for example, in U.S. Published Patent Application No. 2009/0272437, incorporated by reference herein for this purpose. In such an embodiment, element 110 of FIG. 1A would be absent and element 102 would be in contact with the front, light-incident layer 104.

Figure 1B:
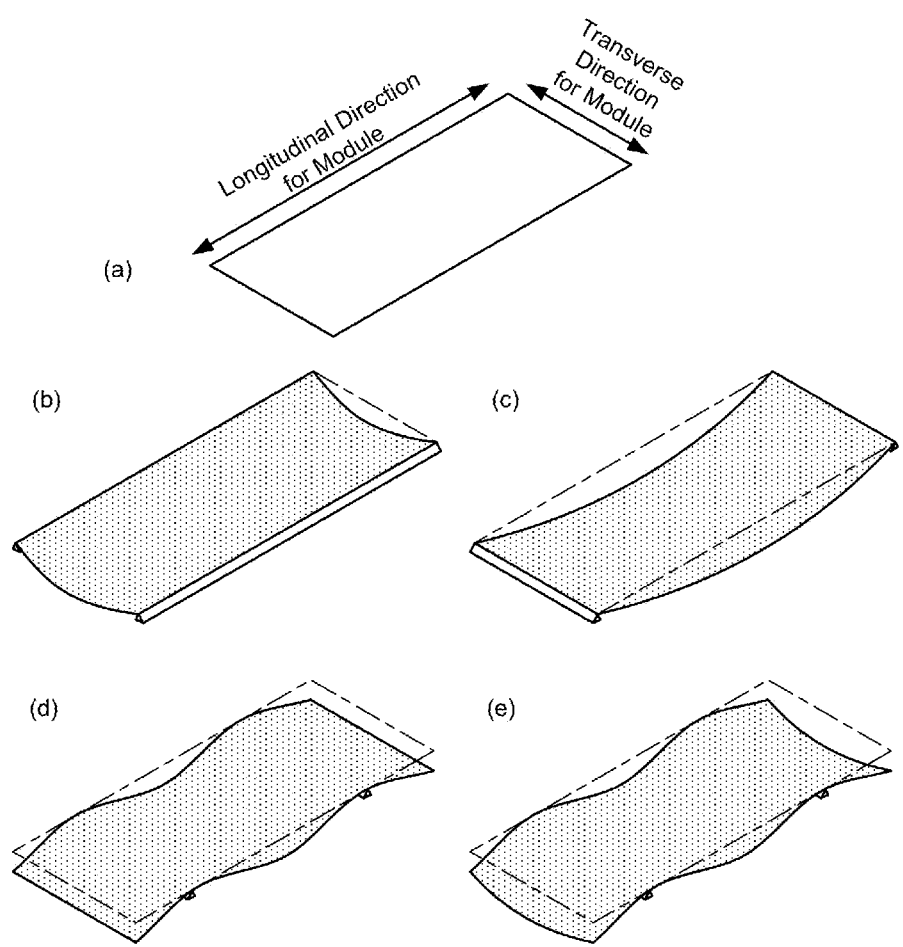
FIG. 1B illustrates orientation conventions referenced in this document with respect to a representative frameless photovoltaic module in accordance with the present invention.

Frameless photovoltaic modules are often rectangular in overall shape, as shown in FIG. 1B. For purposes of discussion, references to frameless photovoltaic modules herein will be made in the context of a rectangular module possessing a longitudinal axis or direction and a transverse axis or direction (as depicted in FIG. 1B, diagram (a)), wherein the longitudinal axis is along the major (larger) dimension of the rectangle and the transverse axis is along the minor (smaller) dimension of the rectangle. Similarly, reference may be made to the length and width of the module. The length of a module refers to the major dimension of the rectangle; the width of a module refers to the minor dimension of the rectangle. Of course, frameless photovoltaic modules may take on a variety of forms departing from a rectangle, and reference to rectangular modules, rectangles, and longitudinal or transverse axes, dimensions, or directions, should not be viewed as limiting the invention only to rectangular modules.

Reference is also made in this application to sagging of a frameless photovoltaic module. In some cases, a module will be described as experiencing sagging along a transverse or longitudinal direction. Sag along a transverse direction refers to sagging behavior which manifests as a non-linear displacement of the module from a line running in a transverse direction, as depicted in FIG. 1A, diagram (b). Sag along a longitudinal direction refers to sagging behavior which manifests as a non-linear displacement of the module from a line running in a longitudinal direction, as depicted in FIG. 1A, diagram (c). A module may sag at multiple points depending on the method of support, as depicted in FIG. 1A, diagram (d). Sag may occur along both transverse and longitudinal directions to different degrees at the same time and result in complex overall displacement, as depicted in FIG. 1A, diagram (e).

Frameless Photovoltaic Module Cable Mounting Systems

Figure 2A:
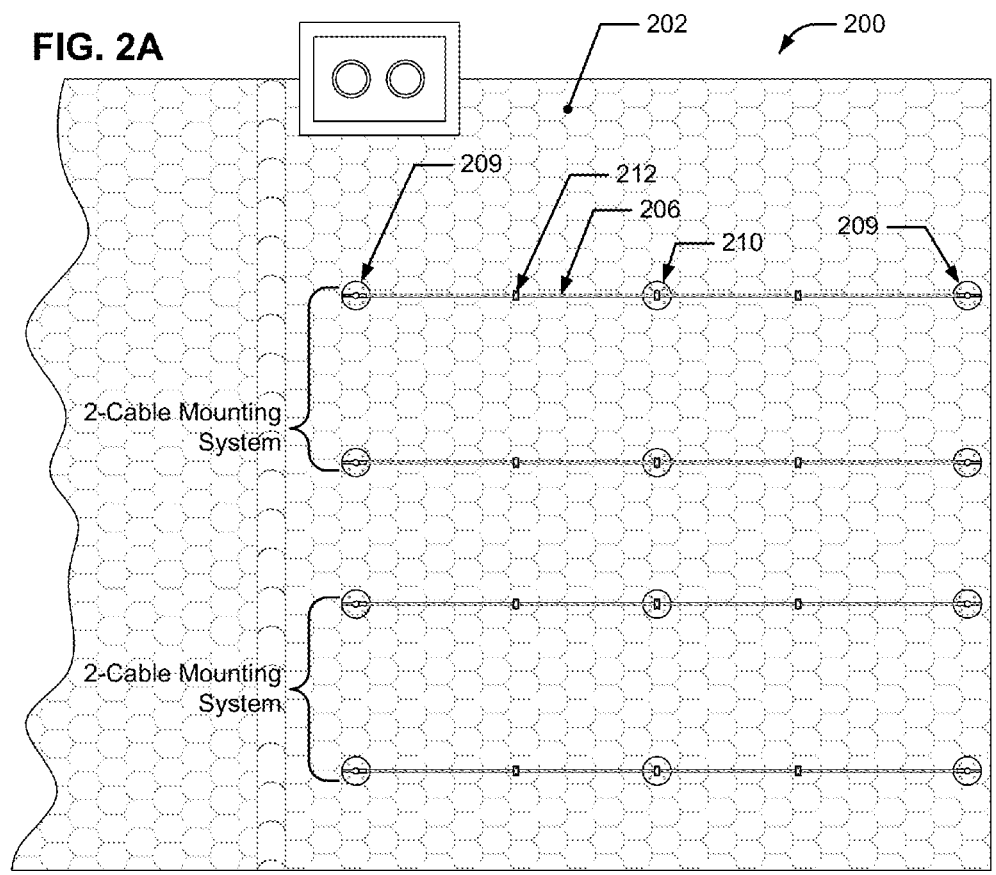
FIG. 2A depicts a partial plan view of an example frameless photovoltaic module cable mounting installation on a household roof.
Figure 2B:
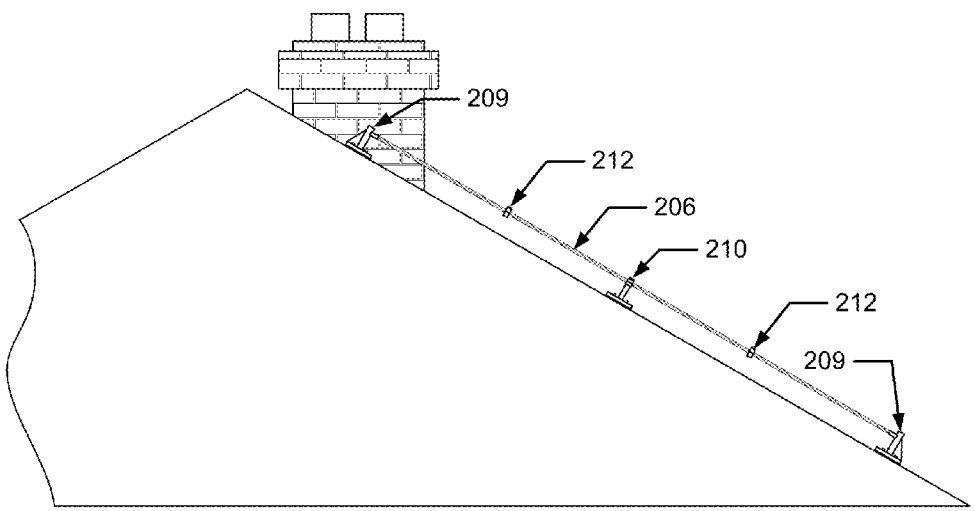
FIG. 2B depicts a side view of the cable mounting installation shown in FIG. 2A.
Figure 2C:
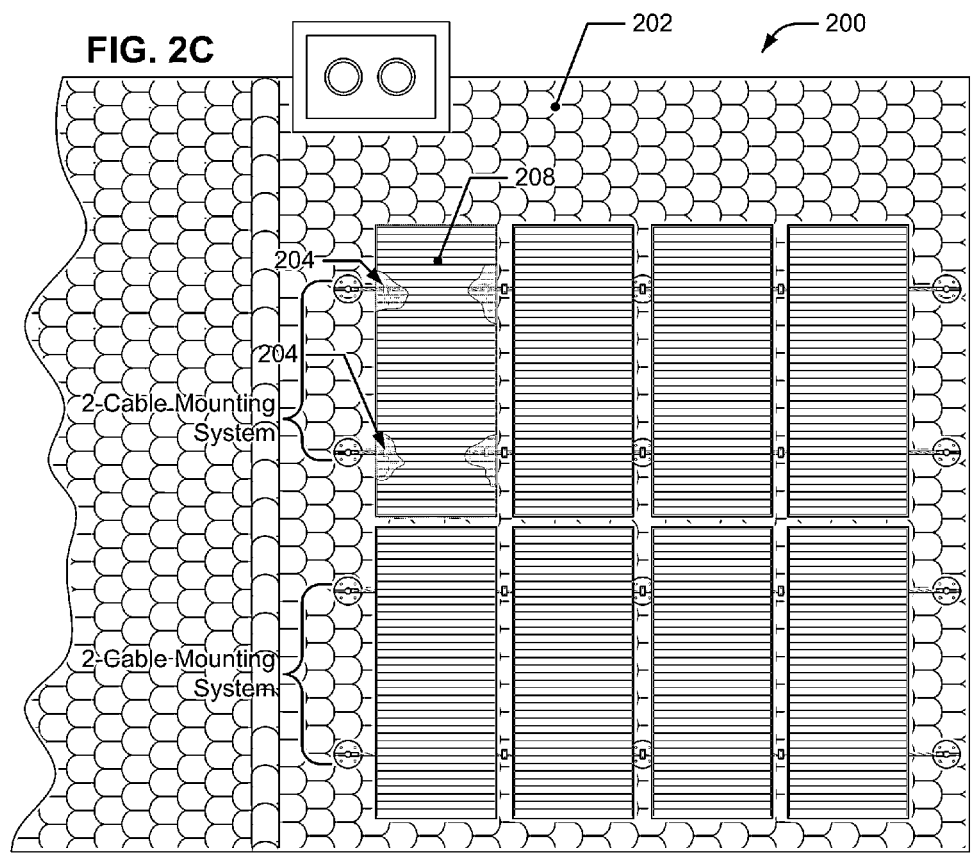
FIG. 2C depicts a partial plan view of an example frameless photovoltaic module cable mounting installation on a household roof with frameless photovoltaic modules installed.
Figure 2D:
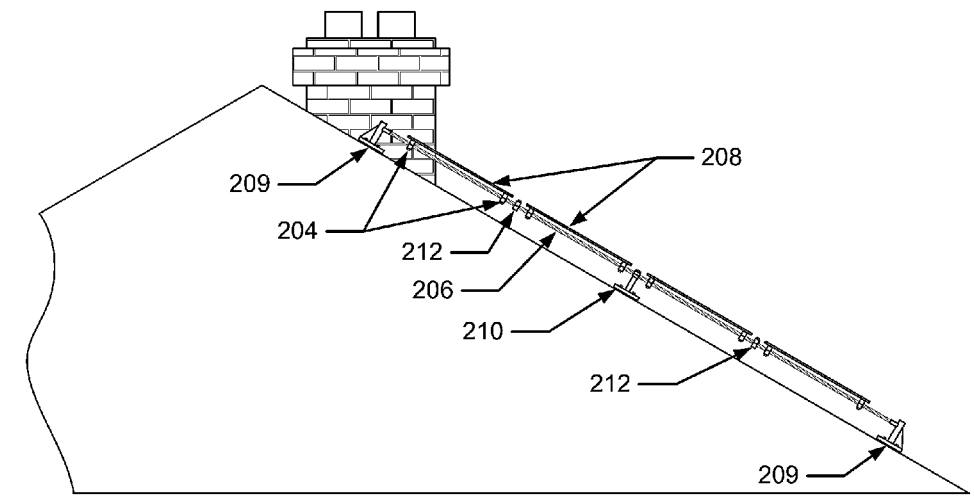
FIG. 2D depicts a side view of a cable mounting installation and mounted modules shown in FIG. 2C.

Frameless photovoltaic modules may be mounted onto cable-based mounting systems when installed at their installation locations. A plan view of an example cable mounting system is shown in FIGS. 2A and 2C, with and without the modules mounted respectively. Respective side views are shown in FIGS. 2B and 2D. Such cable mounting systems 200 are frequently attached to freestanding support structures, roofs 202, carports, walls, or other structures which receive exposure to sunlight and can support the weight of cables 206 and installed frameless photovoltaic modules 208 and maintain sufficient cable tension in cables 206. Alternatively, cables 206 may be deployed on freestanding ground-based structures. All such structures are often oriented, or may be re-oriented, to present the mounted frameless photovoltaic modules 208 in an orientation that promotes efficient solar power generation.

In one embodiment, cable mounting system 200 includes two or more cables 206 which support one or more frameless photovoltaic modules 208. Cables 206 may be mounted to a structure, such as roof 202, using end mounts 209 and intermediate mounts 210. Mounting cables 206 may also be attached to a supplemental support structure; the supplemental support structure may elevate or position the cables 206 in a more optimum manner (e.g., position the cables 206 such that attached frameless photovoltaic modules 208 will be oriented towards the sun to a greater extent).

Cable 206 may be integral to end mounts 209. For example, cable 206 may be swaged, brazed, soldered, or otherwise permanently attached to end mount 209. Alternatively, cable 206 may be removably mounted to end mount 209, such as through the use of clamps, flared stops, or eyelets. A tensioning device or mechanism may be incorporated into end mount 209 or cable 206. For example, a turnbuckle may be incorporated into cable 206 to allow cable slack to be removed.

Intermediate mount 212 may be clamped onto cable 206 or slid over cable 206. Intermediate mount 212 may provide support to cable 206 to mitigate sagging of cable 206. Intermediate mount 212 may also be configured to clamp cable 206 to prevent slippage of cable 206 relative to intermediate mount 212.

End mounts 209 and intermediate mounts 212 may be mounted to roof 202, or other mounting structure, through any fastening system compatible with the surface to be mounted to. For example, end mounts 209 and intermediate mounts 212 may include a mounting plate with a hole pattern for accepting threaded fasteners. End mounts 209 and intermediate mounts 212 may be attached, for example, to roof 202 using screws. Additional mounting methods and techniques may also be used. For example, screws may be augmented with a layer of waterproof silicone adhesive.

The cables 206 are preferably manufactured from steel or other high-strength material. Cables 206 are also preferably manufactured from a corrosion and UV-resistant material, such as stainless steel. The diameter of cable 206 may be sized to support a given module installation. For example, cable 206 may have a diameter of 0.25".

Modules 208 may be attached to cables 206 using one or more cable clamps 204. Cable clamps 204 may be clamped onto cables 206 such that cable clamps 204 secure module 208 in place and prevent module 208 from sliding along cables 206. FIG. 2C depicts locations of four cable clamps 204 in plan view with respect to one module 208, which is shown with cutaway transparent regions in the vicinity of cable clamps 204. Representative cable clamps are discussed in greater detail below with reference to FIGS. 3A-E.

Stop clamps 212 may be attached to cables 206 as an installation aid or as a safety device. Stop clamps 212 may serve as a backup positive stop along cable 206 and may be used to prevent excessive sliding of modules 208 during and after installation. Stop clamps 212 may be installed with or without a gap between stop clamp 212 and cable clamp 204.

Frameless photovoltaic modules mounted to cable mounting systems may experience sagging in areas not directly supported by a cable due to the modules' weight and geometry. In a two-cable mounting system, a frameless photovoltaic module will typically only be externally supported at the cable locations. At the two cable locations, the frameless photovoltaic module may rest on the cables themselves. In areas where the frameless photovoltaic module does not receive external support, the module must be self-supporting, i.e., the module must rely on the material properties and geometry of the module for support.

Two-cable mounting cable systems may be spaced according to the L/4 rule, in which the midpoints of the cables are typically positioned at a distance of L/4 from the transverse edges of a module, where L refers to the length of the module. For example, for a 1611 mm×665 mm module, the L/4 distance would be 402.75 mm.

In a preferred embodiment, the transverse midpoint of each cable in a two-cable cable mounting system is instead positioned approximately 22% of the length of the module from the transverse edges of the module. Thus, for a 1611 mm×665 mm module, the midpoints of the cables would be positioned about 354.4 mm from either transverse edge along the longitudinal axis.

More particularly, the midpoint of each cable in a two-cable mounting system may be positioned approximately 22.3% of the length of the module from a transverse edge of the module. 55.4% of the module would thus be located between the midpoints of the two cables.

Cable Clamps

Figure 3B:
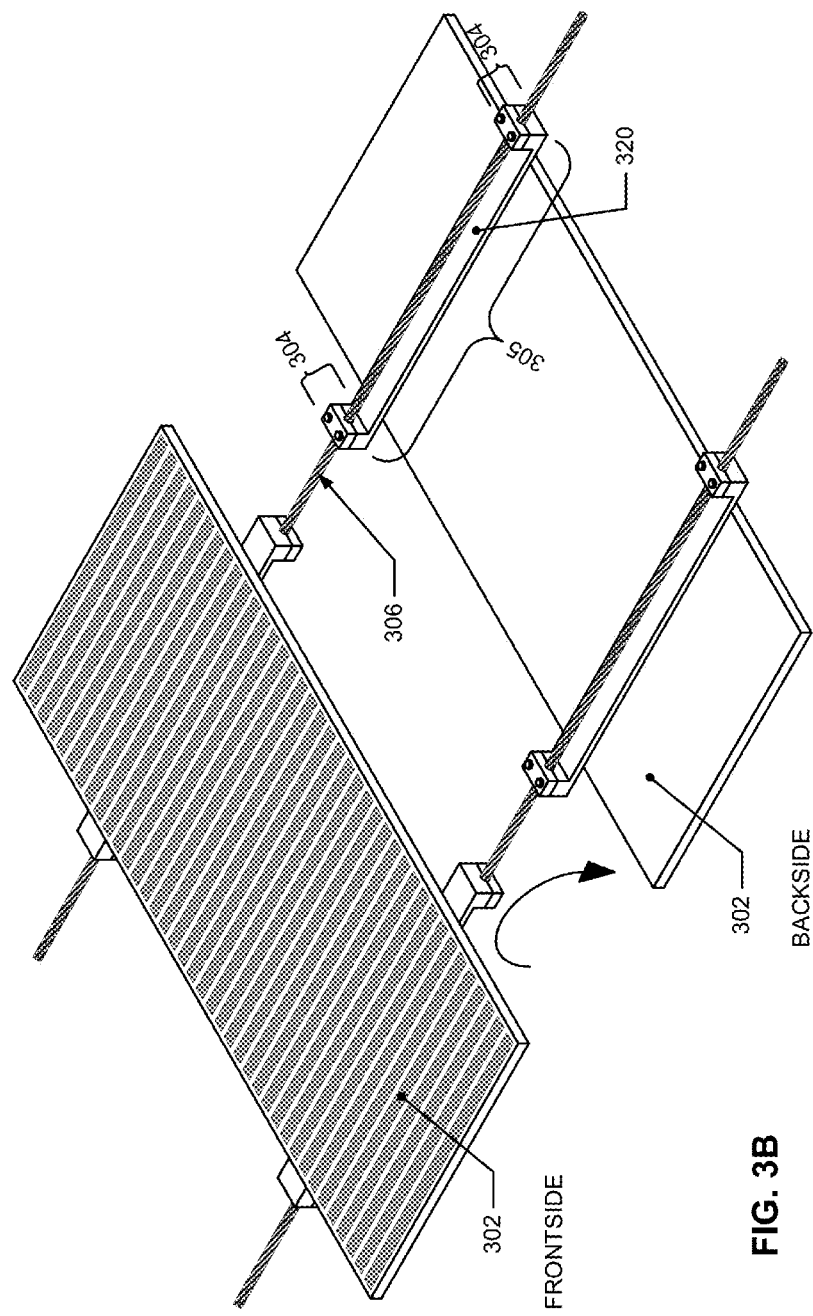
FIG. 3B is an isometric view of the front and back sides of representative frameless photovoltaic modules, cables, and installed multi-clamp assembly and cable clamps.

Frameless photovoltaic module 302, shown in FIG. 3A, may be attached to cables 306 using cable clamps 304. Cable clamps 304 may be individually attached to module 302 or may comprise a multi-clamp assembly 305, such as shown in FIG. 3B. A suitable multi-clamp assembly 305 may comprise a strip of material with a length substantially matching the transverse width of module 302 and with features configured to mate with cable clamps 304. In an alternate embodiment, multi-clamp assembly 305 may comprise strip of material 308 with a length exceeding the transverse width of module 302 such that, when mounted transversely to module 302, multi-clamp assembly 305 may extend beyond the longitudinal edges of module 302. Multi-clamp assembly 305 may be mounted to the backside sheet of module 302, as shown in FIG. 3B, or incorporated within the structure of module 302.

It is to be understood that FIG. 3A and FIG. 3B each depict two modules on the same cable but facing opposite directions to conveniently convey to the reader the details of the frontside and backside of the modules in one diagram and is not representative of an actual mounting arrangement. In most installations, modules 302 would all face the same general direction.

It is to be understood that cable clamp 304 may include sufficient features to clamp or grip cable 306, such as upper saddle 312 and lower saddle 316 in FIGS. 3C and 3D. However, when used in conjunction with multi-clamp assembly 305, cable clamp 304 may only include some of the features required to clamp or grip cable 306; the remaining features may be included as part of multi-clamp assembly 305. For example, with reference to FIG. 3C, upper saddle 312 may be integrated with strip of material 308 to form multi-clamp assembly 305. Finally, cable clamp 304 may include sufficient features to clamp or grip cable 306 and may be mounted to multi-clamp assembly 305. For example, multi-clamp assembly 305 may consist of a bar with mounting holes at either end and cable clamp 304 may simply be mounted to the bar via the mounting holes.

Multi-clamp assembly 305 and/or cable clamp 304 may include features for mounting multi-clamp assembly 305 and/or cable clamp 304 to cable 306. For discussion purposes, examples of such features are provided below in the context of cable clamp 304, although it is to be understood that such features may also be implemented on multi-clamp assembly 305 in combination with cable clamp 304, as outlined previously.

In one embodiment, cable clamp 304 may include upper saddle 312 and lower saddle 316, both of which are configured to be clamped around cable 306, as shown in FIGS. 3C and 3D. Cable clamp 304 may also include fasteners 314, such as machine screws or bolts, which may be tightened to compress cable 306 between upper saddle 312 and lower saddle 316. Upper saddle 312 may be mounted to the backside sheet of module 302 using adhesive 310.

In another embodiment, cable clamp 304 may include upper jaw 318, lower jaw 317, and swivel wingnut 319, as shown in FIGS. 3E and 3F. Upper jaw may be mounted to the backside sheet of module 302 using adhesive 310. Lower jaw 317 may be pivoted about pivot 320 to clamp around cable 306. Swivel wingnut 319 may then be pivoted into a slot in the end of lower jaw 317 and tightened to draw lower jaw 317 against upper jaw 318 and securely clamp cable 306. In yet another embodiment, shown in FIGS. 3G and 3H, swivel wingnut 319 is replaced with draw latch 321, which allows for rapid clamp-down during installation.

Multi-clamp assembly 305 and cable clamp 304 may each be a single material or an assembly of different materials. For example, multi-clamp assembly 305 may comprise an extruded aluminum channel. Alternatively, multi-clamp assembly 305 may comprise a layered composite or a plastic.

In yet a further embodiment, multi-clamp assembly 305 may comprise a metal substrate overlaid with a layered composite or a fiber-reinforced plastic.

Figure 3I:
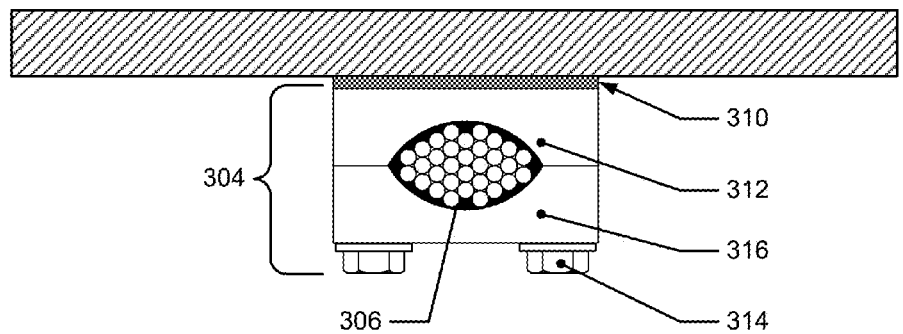
FIG. 3I is a side view of a representative saddle-clamp cable clamp with elastomeric cushion.
Figure 3J:
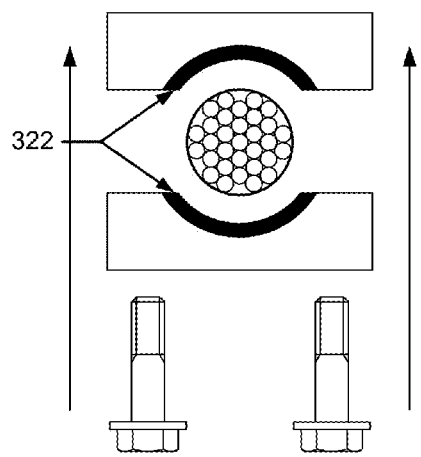
FIG. 3J is a side view of the representative saddle-clamp and elastomeric cushion of FIG. 3I but in an exploded view.

In one embodiment, cable clamp 304 and/or multi-clamp assembly 305 may include an elastomeric or other compliant material to enhance the clamping grip on cable 306. The elastomeric material may also protect cable 306 from crimping due to direct contact with harder cable clamp materials, such as steel or aluminum. An example saddle clamp featuring elastomeric cushion 322 on upper saddle 312 and lower saddle 316 is shown in FIGS. 3I and 3J. Of course, elastomeric cushion 322 may not be required to completely encircle cable 306 when cable 306 is clamped.

Multi-clamp assembly 305 may be constant in cross-section along its length or possess a variable cross-section, as shown in FIG. 3B. Multi-clamp assembly 305 may also incorporate any of a variety of different cross-sections, including solid-core, hollow-core, and open-channel cross-sections. For example, multi-clamp assembly 305 may include rectangular cross-section. Alternatively, multi-clamp assembly 305 may consist of a hollow, thin-wall, rectangular cross-section. Multi-clamp assembly 305 may, in another embodiment, feature a flanged channel cross-section.

Cable clamp 304 or multi-clamp assembly 305 may be attached to module 302 through the use of adhesives, adhesive tape, diffusion bonding, or may even be sandwiched between layers of module 302 during module assembly. For example, if the backsheet of module 302 comprises 4 layers of woven composite, multi-clamp assembly 305 may be installed between the layup of the inner two layers and the outer two layers.

Cable clamps 304 may be attached to module 302 such that two cable clamps 304 are placed approximately 22% of module 302's length from the transverse edges of module 302.

Installation of Cable Clamps

Cable clamps may be attached to modules at any of several points in time. During manufacture of the module, a cable clamp may be woven into a composite forming the backsheet, as discussed above with respect to multi-clamp assemblies. Such installation would need to be done at the module manufacturing site due to the integrated nature of the cable clamp installation.

An alternative is to glue the cable clamps to the module backsheet. For example, cable clamps may be attached to the module backsheet using a silicone adhesive, such as Dow-Corning PV804™ silicone, which is marketed for use with solar power systems. A UV-stable adhesive may be used to prevent UV degradation.

Alternatively, an adhesive tape, such as 3M acrylic VHB™ may be used to attach the cable clamps to the module. Adhesive tape may be preferable to liquid adhesive due to the relatively instantaneous bond that forms. Such post-module-manufacture installation may be performed at the module manufacturing facility or at a secondary facility. The cable clamps bonding may be performed in controlled conditions to maximize bond strength and quality.

Finally, cable clamps may be attached to the module backsheet at a remote location, such as a solar panel installation jobsite. For example, cable clamps may be attached to modules using silicone, as discussed above, but in the field instead of in the factory. However, installation in a controlled environment is preferred for quality control purposes. For example, field installation runs an increased risk of dirt and other contaminants being trapped between the cable clamps and the module. Such foreign substances may cause a substandard adhesive bond, generate stress concentrations, or become a source for abrasion of the module. Installation in a controlled environment may also allow for any curing process which may be required to be accelerated or kept within required environmental conditions.

While care must be taken to ensure that cable clamps are attached to the module in the correct locations, tolerances for cable clamp installation may be less stringent than for other mounting systems, such as parallel rail systems. One of the advantages of cable mounting systems is that minor tolerance variations in cable clamping locations may be absorbed through the inherent flex of the cable.

Example Modeling

Modeling was conducted in order to demonstrate the advantages provided by various aspects of this invention with regard to the positioning of the mounting locations. The data presented here are intended to better illustrate the invention as described herein and are non-limiting. The analyses shown reflect a rigid rail mounting configuration, although the analysis results may be generally extrapolated to cable mounting systems as well.

Figure 4A:
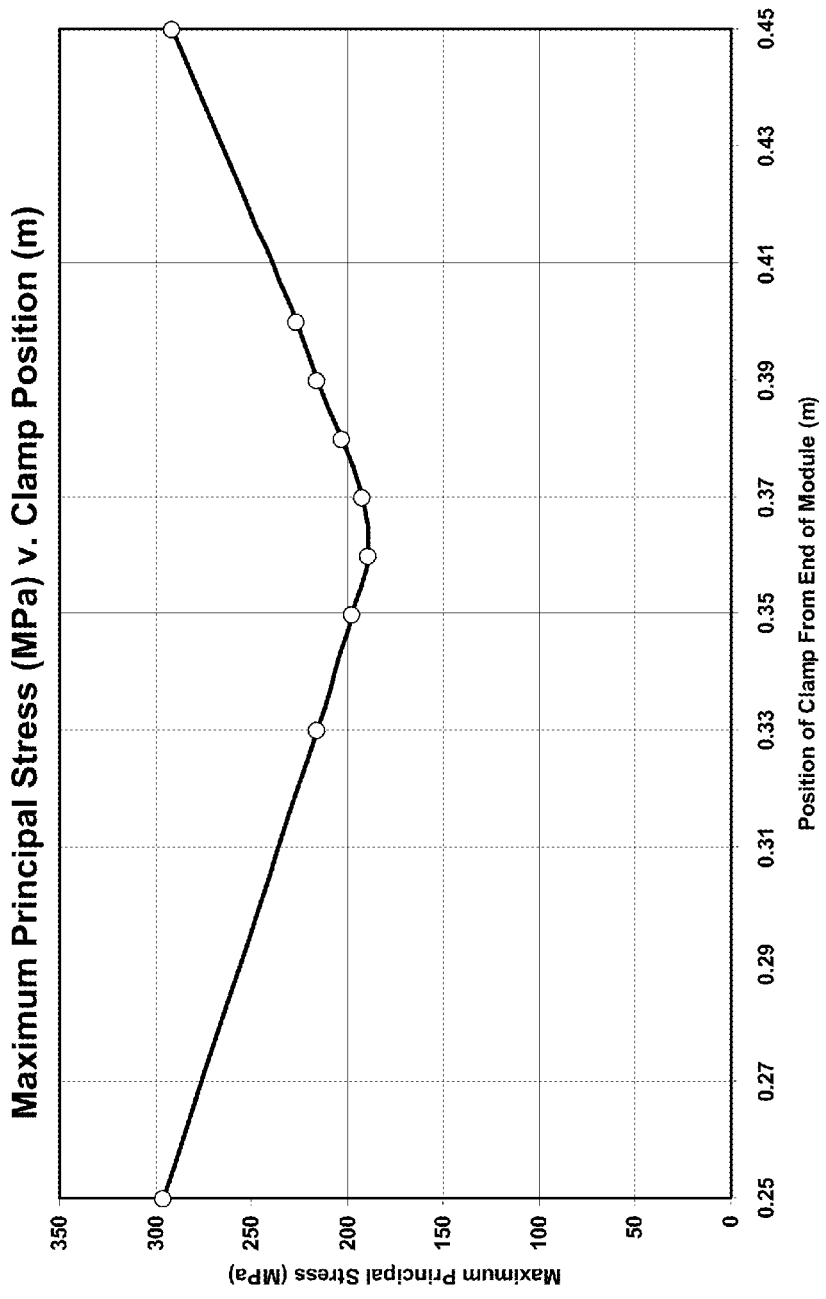
FIG. 4A is a plot of maximum principal stress versus clamp position in a representative module.

FIG. 4A depicts a plot of the maximum principal stress experienced by a typical module depending on the distance of mounting clamps from the transverse edge of the module. For the analyzed module, positioning mounting locations at approximately 22% of the longitudinal length of the module from either transverse edge reduced the resulting maximum principal stress by approximately 37 MPa relative to the stress induced by a L/4 rail spacing.

Figure 4B:
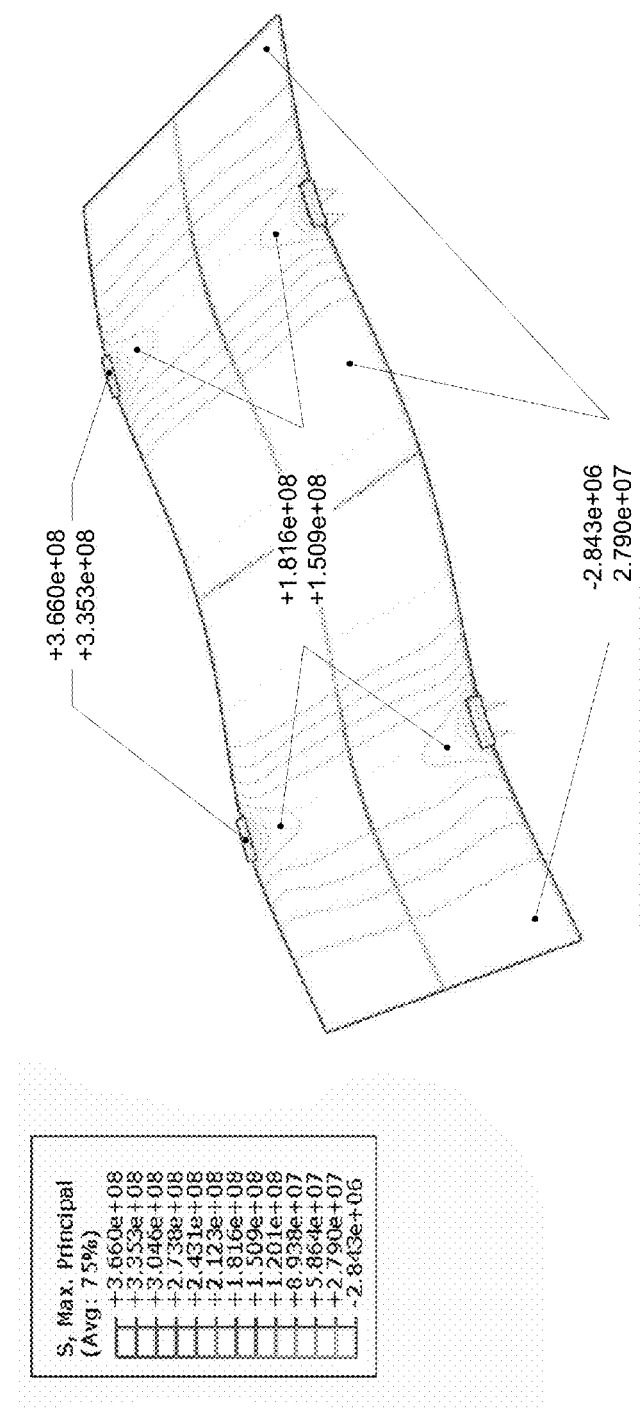
FIG. 4B is a stress contour plot of a representative module and clamping arrangement.

FIG. 4B is a stress contour plot of an example frameless photovoltaic module supported by two mounting rails, each rail attached to the module via two edge clamps. The rail spacing in this plot is approximately 22% of the module longitudinal length from either transverse edge. The combination of sag loading and localized stress concentrations in the regions of the edge clamps results in a peak principal stress of 366 MPa.

Example Installation Process

Figure 5:
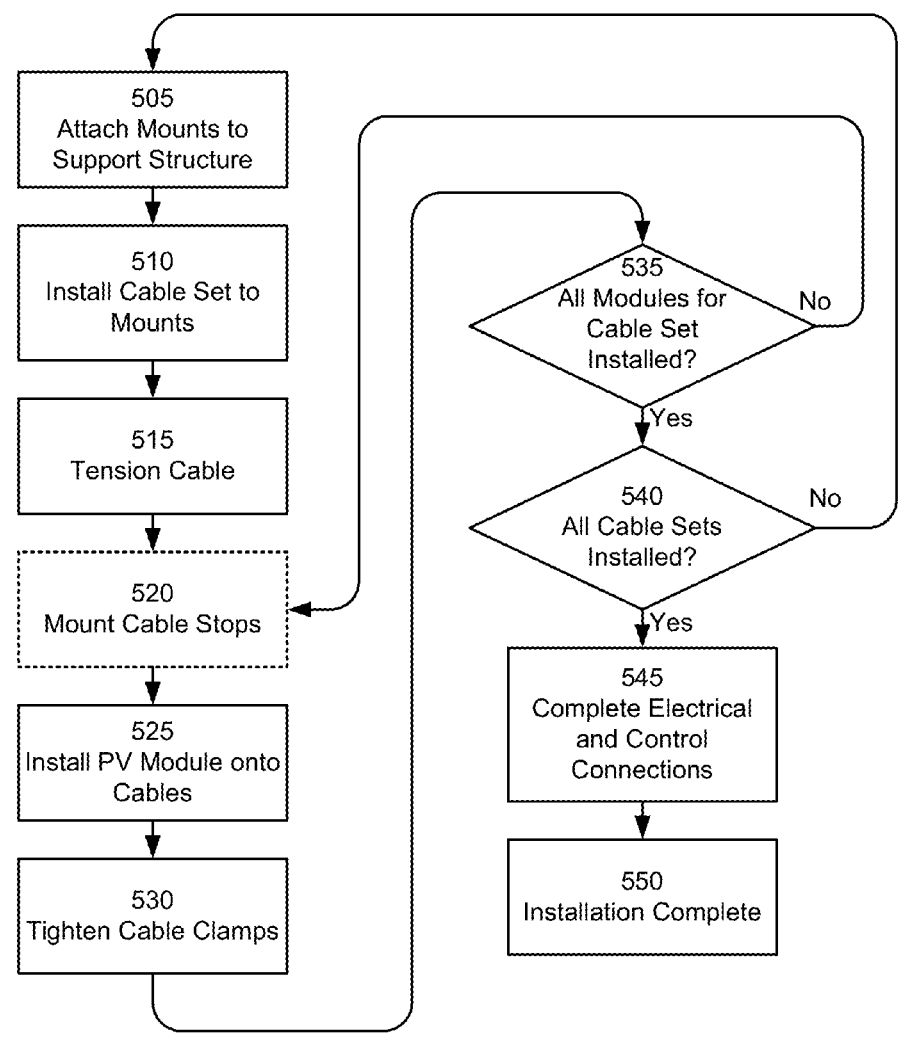
FIG. 5 is a flow diagram for a frameless photovoltaic module installation process in accordance with an embodiment of the invention utilizing the methods and equipment discussed in this application.

An example installation process utilizing cable mounting systems in conjunction with cable clamp-equipped modules is diagrammed in FIG. 5. It should be noted that not all of the operations depicted and described are necessarily part of a process in accordance with the present invention; an installation process in accordance with the invention may include all or just some of the operations described. A number of the operations are provided for context to facilitate description and understanding of the invention, but are optional in some embodiments.

Installation process 500 begins with the installation of end mounts and, if needed, intermediate mounts, onto a support structure, as shown in step 505. This may include attaching two or more end mounts to a roof, carport, or other support structure.

In step 510, the cable sets may be installed onto the installed end mounts and intermediate mounts, if present. If the cables are permanently attached to the end mounts, this step may be redundant in view of step 505.

In step 515, the cables may be tensioned appropriately. Tensioning may be repeated throughout the installation process if warranted. For example, the cables may sag after module installation due to the increased distributed loads from the modules. This sagging may be mitigated through re-tensioning. Truing of the cables is largely unnecessary, as cables are self-truing in the horizontal direction.

In step 520, cable stops may be installed onto the cables. Cable stops may be installed between each module mounting location, between groups of modules, or not at all, depending on the characteristics of the installation. For example, cables mounted on a steep slope may require more cable stops than cables which are substantially horizontal.

In step 525, a module is installed onto the mounted cables. Installing a module may involve placing cable clamps attached to the module onto the mounted cables.

In step 530, the cable clamps are clamped onto the cable using associated hardware, such as threaded fasteners or draw latches.

In step 535, the installation process returns to step 520 if any modules remain which will be installed on the installed cable set.

In step 540, the installation process returns to step 505 if there are any cable sets remaining to be installed.

In step 545, electrical and control connections are made to the mounted modules, and any support electronics are installed and configured. In step 550, the mechanical installation is complete.

Of course, the above steps are merely examples of an installation process using the described technology. The ordering of the steps may be changed significantly—for example, it is not necessary to install the modules for one cable set before installing a second cable set. The order set forth in FIG. 5 should not be construed as limiting in any way.

CONCLUSION

Although the foregoing invention has been described in some detail for purposes of clarity of understanding, it will be apparent that certain changes and modifications may be practiced within the scope of the invention. It should be noted that there are many alternative ways of implementing both the processes and apparatuses of the present invention. Accordingly, the present embodiments are to be considered as illustrative and not restrictive, and the invention is not to be limited to the details given herein.

What is claimed is:

1. A photovoltaic module assembly, comprising:
a frameless photovoltaic module comprising a frontside sheet and a backside sheet, the module having a length corresponding to a longitudinal direction and a width corresponding to a transverse direction; and
two cable clamp assemblies for attachment of the module to a cable-based mounting structure, the two cable clamp assemblies attached to the backside sheet of the module, each cable clamp assembly consisting of:
a strip of material spanning the transverse direction of the module and attached to the backside sheet of the module, the strip of material having a length longer than the transverse width of the module such that the strip of material extends beyond the module width on both sides of the module, the strip of material having a major axis along the transverse direction of the module, the strip of material terminating at each end in a first portion; wherein each first portion extends beyond the module width; wherein each first portion has a thickness in a direction substantially perpendicular to the major axis that is greater than a thickness of the strip of material in a second portion that does not extend beyond the module width and
cable clamp components, wherein the clamp components are attached to the strip of material at each first portion, such that, when the module is attached to the cable-based mounting structure, the strip of material in the second portion is elevated above a cable.

2. The photovoltaic module assembly of claim 1, wherein each cable clamp assembly is attached to the backside sheet of the module by a UV-stable adhesive.

3. The photovoltaic module assembly of claim 2, wherein each of the cable clamp components comprises a plurality of members configured to receive the cable in a channel, and one or more fasteners for securing the members to the cable in the channel.

4. The photovoltaic module assembly of claim 3, further comprising an elastomer in the channel.

5. The photovoltaic module assembly of claim 1, wherein the cable clamps comprise a structure selected from the group consisting of swivel wingnuts and draw latches.

6. The photovoltaic module assembly of claim 1, wherein the strip of material comprises a material selected from the group consisting of metal, plastic and composite, and combinations thereof.

7. The photovoltaic module assembly of claim 1, wherein the cable clamp assemblies are arranged in two rows, each row positioned about 22% of the module length from each end of the module.

8. The photovoltaic module assembly of claim 1, wherein the frontside sheet is a glass sheet.

9. The photovoltaic module assembly of claim 8, wherein the backside sheet is a glass sheet.

10. The photovoltaic module assembly of claim 8, wherein the backside sheet is a non-glass flexible sheet.

11. The photovoltaic module assembly of claim 10, wherein the backside sheet comprises one or more materials selected from the group consisting of a polyethylene terephthalate, a polypropylene, a polybutylene, and a polybutylene terephthalate.

12. The photovoltaic assembly of claim 1, wherein the frameless photovoltaic module comprises a plurality of interconnected copper indium gallium selenide (CIGS) cells.

13. A method of making a frameless photovoltaic module assembly, the method comprising:
providing a frameless photovoltaic module comprising a frontside sheet and a backside sheet, the module having a length corresponding to a longitudinal direction and a width corresponding to a transverse direction; and
attaching two cable clamp assemblies to the backside sheet of the module, the two cable clam assemblies configured for attachment of the module to a cable-based mounting structure;
wherein each cable clamp assembly consists of:
a strip of material spanning the transverse direction of the module and attached to the backside sheet of the module, the strip of material having a length longer than the transverse width of the module such that the strip of material extends beyond the module width on both sides of the module, the strip of material having a major axis along the transverse direction of the module, the strip of material terminating at each end in a first portion; wherein each first portion extends beyond the module width; wherein each first portion has a thickness in a direction substantially perpendicular to the major axis that is greater than a thickness of the strip of material in a second portion that does not extend beyond the module width and
cable clamp components, wherein the clamp components are attached to the strip of material at each first portion, such that, when the module is attached to the cable-based mounting structure, the strip of material in the second portion is elevated above a cable.

14. The method of claim 13, wherein the cable clamp assemblies are attached to the backside sheet of the module by a UV-stable adhesive.

15. The method of claim 14, wherein each of the cable clamp components comprises a plurality of members configured to receive the cable in a channel, and one or more fasteners for securing the members to the cable in the channel.

16. The method of claim 15, further comprising providing an elastomer in the channel.

17. The method of claim 13, wherein the two cable clamp assemblies are arranged in two rows, each row positioned about 22% of the module length from each end of the module.

18. A photovoltaic assembly, comprising:
a photovoltaic module cable-based mounting structure comprising a plurality of cables; and
a frameless photovoltaic module comprising a frontside sheet and a backside sheet, the module having a length corresponding to a longitudinal direction and a width corresponding to a transverse direction; and
two cable clamp assemblies for attachment of the module to the cable-based mounting structure, the two cable clamp assemblies attached to the backside sheet of the module and the plurality of cables,
each cable clamp assembly consisting of:
a strip of material spanning the transverse direction of the module and attached to the backside sheet of the module, the strip of material having a length longer than the transverse width of the module such that the strip of material extends beyond the module width on both sides of the module, the strip of material having a major axis along the transverse direction of the module, the strip of material terminating at each end in a first portion; wherein each first portion extends beyond the module width; wherein each first portion has a thickness in a direction substantially perpendicular to the major axis that is greater than a thickness of the strip of material in a second portion that does not extend beyond the module width and
cable clamp components, wherein the clamp components are attached to the strip of material at each first portion, such that, when the module is attached to the cable-based mounting structure, the strip of material in the second portion is elevated above a cable of the plurality of cables; wherein each of the cable clamp assemblies is clamped to a cable of the plurality of cables.

19. The photovoltaic assembly of claim 18, wherein the cable clamp assemblies are attached to the backside sheet of the module by a UV-stable adhesive.

20. The photovoltaic assembly of claim 19, wherein each of cable clamp components comprises a plurality of members configured to receive the cable in a channel, and one or more fasteners for securing the members to the cable in the channel.

21. The photovoltaic assembly of claim 20, further comprising an elastomer in the channel.

22. The photovoltaic assembly of claim 18, wherein the strip of material comprises a material is selected from the group consisting of metal, plastic and composite, and combinations thereof.

23. The photovoltaic assembly of claim 18, wherein the cable clamp assemblies are arranged in two rows, each row positioned about 22% of the module length from each end of the module.

24. The photovoltaic assembly of claim 18, wherein the frontside sheet is a glass sheet.

25. The photovoltaic assembly of claim 24, wherein the backside sheet is a glass sheet.

26. The photovoltaic assembly of claim 24, wherein the backside sheet is a non-glass flexible sheet.

27. The photovoltaic assembly of claim 26, wherein the backside sheet comprises one or more materials selected from the group consisting of a polyethylene terephthalate, a polypropylene, a polybutylene, and a polybutylene terephthalate.

28. The photovoltaic assembly of claim 18, wherein the frameless photovoltaic module comprises a plurality of interconnected copper indium gallium selenide (CIGS) cells.

29. The photovoltaic assembly of claim 18, further comprising:
   one or more stop clamps secured to the cables of the cable-based mounting structure.

30. The photovoltaic assembly of claim 18, further comprising:
   a plurality of mounts securing the cables to a cable support structure, the mounts comprising one or more intermediate mounts in addition to mounts at the cable ends.

* * * * *